Feb. 26, 1935. W. STELZER 1,992,333
PROPELLING DEVICE FOR AIRCRAFT AND THE LIKE
Filed Aug. 27, 1929 3 Sheets-Sheet 1
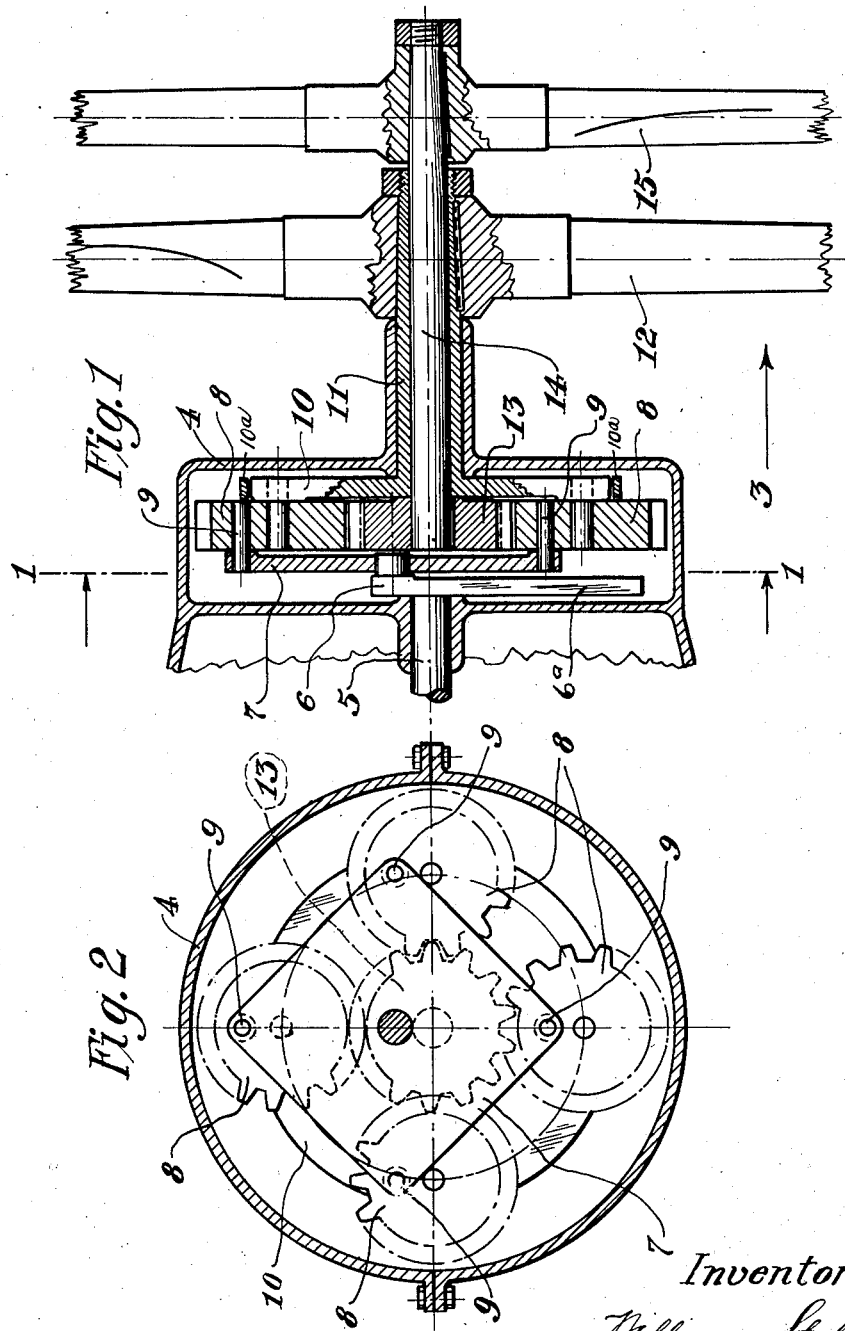
Inventor:
William Stelzer

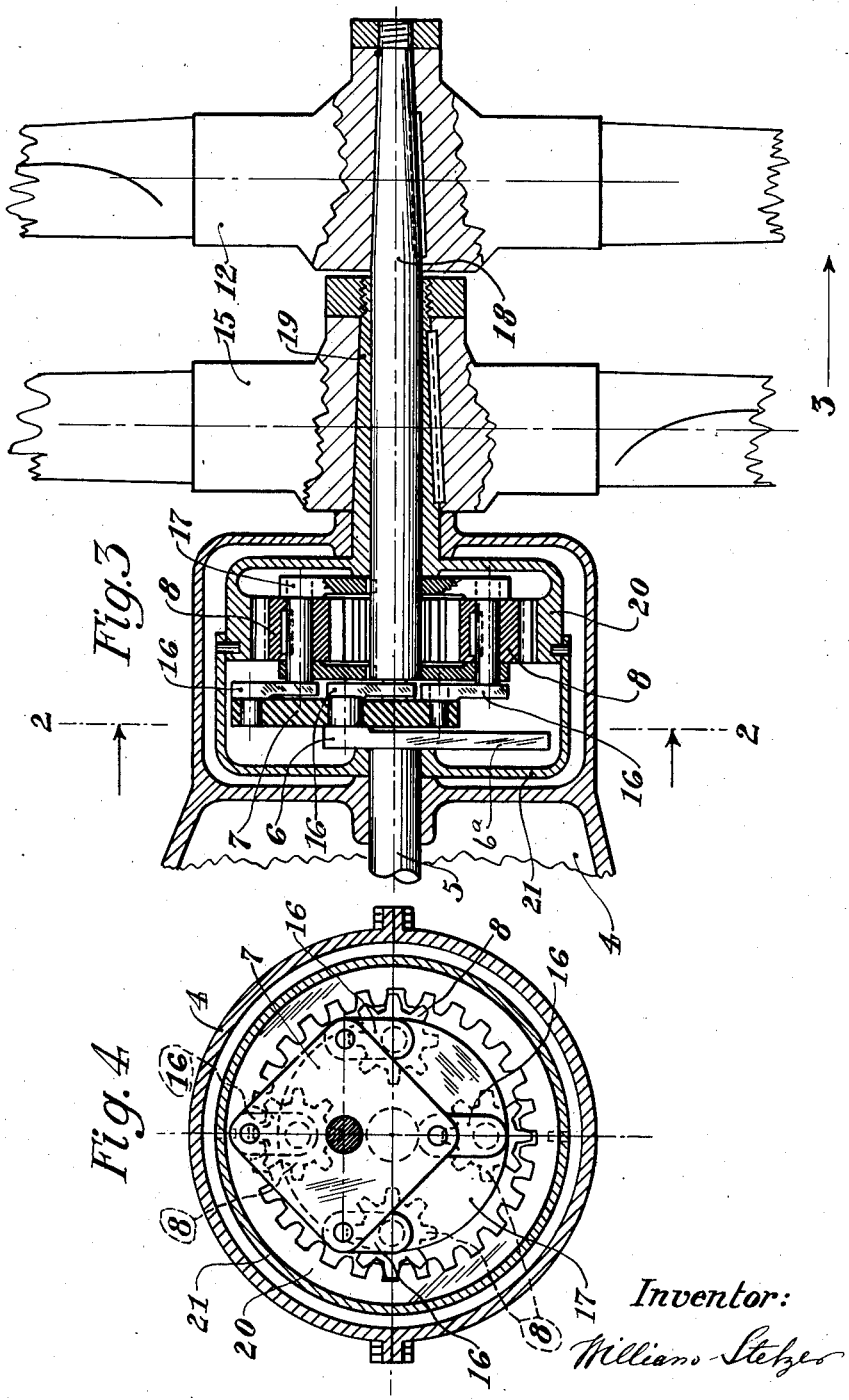

Inventor:
William Stelzer

Patented Feb. 26, 1935

1,992,333

UNITED STATES PATENT OFFICE 1,992,333

PROPELLING DEVICE FOR AIRCRAFT AND THE LIKE

William Stelzer, Chicago, Ill., assignor to Bendix Aviation Corporation, New York, N. Y., a corporation of Delaware Application August 27, 1929, Serial No. 388,829

10 Claims. (Cl. 170—165)

The invention relates to an improvement in an aircraft propulsion system such as described in an application filed by me September 7, 1928, Serial Number 304,477, issued as Patent No. 1,821,450, dated September 1, 1931, wherein a pair of axially alined propellers is driven differentially in opposite directions, speed reduction being obtained by differential motion.

The improvement claimed hereinafter relates to a similar arrangement, where speed reduction is obtained by means of cranks in connection with gears.

Another improvement is to connect a third propeller directly to the engine shaft, so that a very small part of all the work is transmitted by gears. The major part is transmitted by the cranks, a smaller part to said third propeller directly by the shaft, leaving a small amount of work to be transmitted by the gears.

The object of the invention is to eliminate the use of gears as much as possible on account of the high speed desirable for aircraft engines. Furthermore it is possible to transmit power more economically by cranks than by gears, and cranks are cheaper and give longer service than gears. Consequently a reducing mechanism such as described hereinafter may be lighter in weight, more dependable and also less expensive than other types of reducing mechanisms.

Another object is the use of a third propeller to further reduce the use of gears and also to give a support for the other elements of the reducing mechanism.

A still further object is to incorporate the reducing mechanism directly with the engine crank, especially when used in connection with an engine of the radial type. Such an arrangement will further decrease the cost and weight of the device.

With such and other objects in view, I still maintain the very important results obtained by a device as described in the application filed Sept. 7, 1928, Serial #304,477, such as counter propeller action, speed reduction by differential action, and reversal of motion of one of the propellers.

Other objects may appear by inspection of the drawings, wherein:

Figure 1 is a longitudinal cross sectional view of the improved device.

Figure 2 is a section taken on the lines 1—1 of Fig. 1.

Figure 3 is a longitudinal cross-sectional view of the improved device when an internal gear is employed.

Figure 4 is a section taken on lines 2—2 of Fig. 3.

Figure 5:
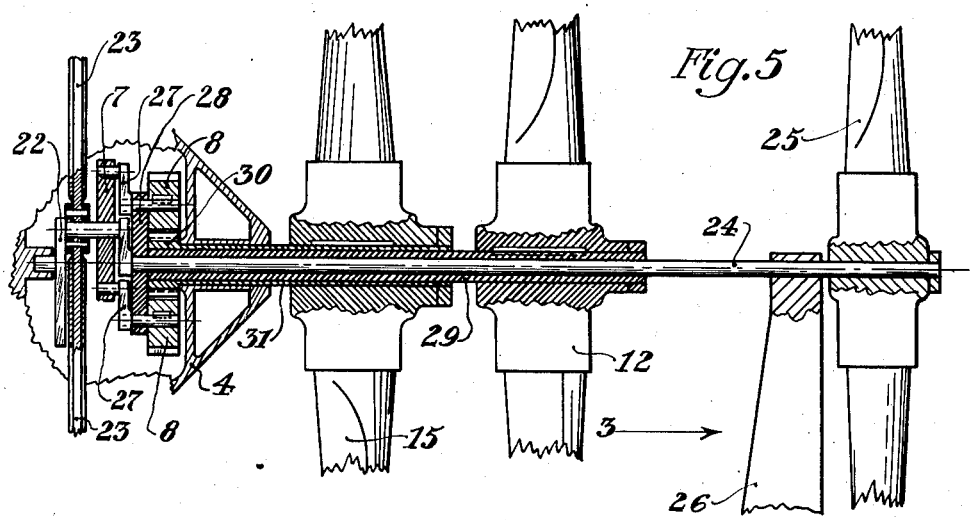
Figure 5 shows a modified form where a third propeller is connected directly to the crank shaft of the engine and where the engine and the reducing mechanism have their crank in common.

The terms employed herein are used in the generic and descriptive sense and therefore are not intended primarily as terms of limitation.

The direction of traction or flight is indicated by the arrow 3. The casing 4 made of two halves constitutes the housing for the reducing mechanism, and may contain the oil necessary for the lubrication of the movable parts therein. This housing may be a unit for itself or it may be part of the engine casing, depending on the type of engine used. The reducing mechanism also may be entirely within the crankcase.

Describing first the embodiment shown in Figure 1, the drive shaft or engine shaft 5 is rigidly formed with a crank or other eccentric means 6 revolubly supporting a plate or frame 7 transmitting rotary motion to the planetary gears 8 by means of crank pins 9. Said crank 6 is provided with a counterweight 6a to balance the plate 7 during rotation. The planetary gears 8 are revolubly supported in the plate or frame 10 rigidly secured to the hollow shaft or propeller hub 11 revolubly supported in the housing 4 and carrying the main propeller 12. The planetary gears 8 mesh with a single gear 13 keyed to the counter-propeller shaft 14 turning inside of the hub 11 and carrying the counter propeller 15. The engine shaft 5, the gear 13, and the propeller shafts 11 and 14 are all axially alined. It will be seen that the axial distances between the pins 9 and the corresponding planetary gears 8 have to be equal to the offset of the drive crank 6.

In the embodiment illustrated in Figure 3 the plate or frame 7 supported by the crank 6 transmits rotary motion to the planetary gears 8 by means of cranks 16 keyed to said gears 8 and revolubly supported in the plates or frame 17 turning the main propeller 12 by means of the propeller shaft 18 revolving within the hollow counter propeller hub 19 the latter carrying the counter propeller 15 and being turned in the casing by the internally toothed gear 20 meshing with the planetary gears 8. A revoluble reenforcing element 21 is rigidly connected with the internally toothed gear 20 to give a better support for the latter as well as for the propeller shafts.

In the embodiment shown in Figure 5 the engine crank 22 supported in the housing or crank case 4 is turned by the piston rods 23, the propeller shaft 24 carrying the third propeller 25 and being supported in the stand or other suitable support 26 is directly connected to the engine crank 22 to turn therewith. The said engine crank 22 carries the plate or frame 7 as in the other embodiments to turn the planetary gears 8 by means of the cranks 27 keyed thereto and turning in the plate or frame 28 rigidly secured to the hollow propeller shaft 29 carrying the main propeller 12 and turning about the shaft 24. The planetary gears 8 engage the single driven gear 30 connected with the hollow counter propeller hub 31 carrying the counter propeller 15.

Figure 6:
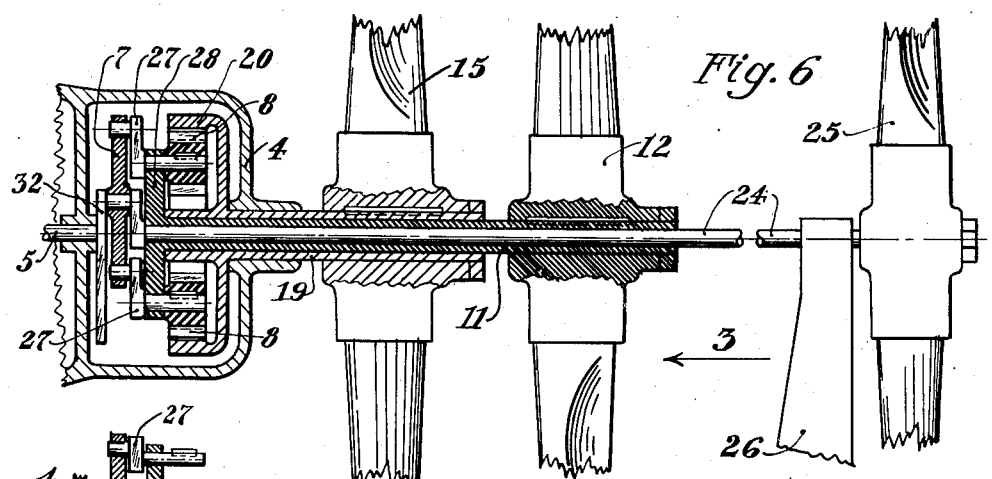
Figure 6 is another modification using a third propeller where an internally toothed gear is employed.

In the modification shown in Figure 6 the engine shaft 5 turns the crank 32 to which is connected the propeller shaft 24 carrying the third propeller 25 supported by said stand 26. The plate or frame 7 turns the planetary gears by the same means as described in Figure 5. The modification consists in using the internally toothed gear 20 such as described in Figure 3, which gear is adapted to turn the counter propeller 15. The main propeller 12 is carried by the hollow shaft 11 turning about the shaft 24 and being connected to the said plate or frame 28 carrying said cranks 27.

Figure 7:
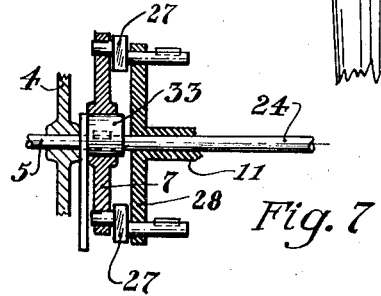
Figure 7 is a further modification illustrating the use of an eccentric instead of a crank.

Figure 7 illustrates how an eccentric 33 may be used instead of the crank 32, or 6. The eccentric 33 is keyed to the drive shaft 5, which also takes the place of the propeller shaft 24 as it drives the propeller 25.

The different embodiments are shown somewhat diagrammatically only, such elements as anti-friction bearings, lubricating devices, and arrangements for facilitating the assembly of the mechanism having been omitted.

The operation is apparent from the drawings. It will be noted that for instance in Figure 1, the main propeller 12 will revolve in the same direction as the drive shaft 5, while the counter propeller 15 will revolve in the opposite direction. In Figure 3 the counter propeller 15 will revolve in the same direction as the drive shaft 5 and the main propeller in the opposite direction.

The relation between the torques of the two propellers will always be constant, which makes it possible that one propeller may be arrested so that the other will turn faster. This is a very important feature because at present the size of a propeller very often depends upon the distance from the engine to the ground. It is desirable to have large propellers, but it is also desirable to place the engine as low as possible. If my invention is employed the main propeller may be selected very large, the counter propeller of smaller diameter. An operable stop may be attached to the housing 4 to keep the main propeller stationary in a horizontal position while taking off or when landing. For example, such stop may comprise braking means such as a contractible strap 10ª which may be applied by any suitable means, not shown, to frictionally grip member 10 in order to arrest the latter and the main propeller at any time. In such event the planetary gears 8 will rotate about their fixed pivots to effect operation of the gear 13 and the counter propeller 15 at a higher speed than heretofore. In such a case the engine would only have to be high enough for the smaller propeller to clear the ground.

In the preferred embodiments four planetary gears have been shown, however, two, or three, or more could be used, depending on the size of the mechanism. While there are herein shown and described the preferred embodiments of the invention, it shall nevertheless be understood that the invention can be carried out in ways different from that shown without departing from the spirit and scope of the invention. Therefore, I do not desire to be limited in the application of my invention nor in the appended claims to the particular embodiments pointed out in the affixed drawings.

I claim:

1. In combination, a drive shaft, eccentric means rotated by said drive shaft, planetary gears, means rotatable about said eccentric means to transmit rotary motion from said drive shaft to said planetary gears, a rotatable gear axially alined with said drive shaft and meshing with said planetary gears, a propeller axially alined with said rotatable gear, means for connecting said propeller with said rotatable gear, means revoluble about the axis of said drive shaft for revolubly supporting said planetary gears, a second propeller and means for connecting said last named means to said second propeller, substantially as described.

2. In combination, eccentric means, means for journaling said eccentric means, a rotatably supported gear coaxial with the journals of said eccentric means, a counter propeller, means for connecting said counter propeller coaxially with said gear to turn therewith, planetary gears meshing with said gear, a support for said planetary gears, said support being arranged to turn about the axis of said gear, a main propeller, means for connecting said support coaxially with said main propeller to turn therewith, a frame revolubly supported by the eccentric means, and eccentric means for connecting said frame with said planetary gears, to transmit motion to rotate said planetary gears, substantially as described.

3. In combination, a drive shaft, a propeller connected with said drive shaft, eccentric means connected with said drive shaft to turn therewith, a gear rotatable about said drive shaft, a counter propeller, means for connecting said counter propeller with said gear to turn therewith, planetary gears meshing with said gear, a support for said planetary gears, said support being arranged to turn about the axis of said gear, a main propeller, means for connecting said support coaxially with said main propeller to turn therewith, a frame revolubly supported by said eccentric means, and eccentric means for connecting said frame with said planetary gears to transmit rotary motion from said first mentioned eccentric means to said planetary gears, substantially as described.

4. In combination, a crank, means for turning said crank, a propeller shaft driven by said crank, a propeller mounted to said propeller shaft to turn therewith, an internally toothed gear rotatable about said propeller shaft, a counter propeller, means for connecting said counter propeller coaxially with said internally toothed gear to turn therewith, planetary gears meshing with said internally toothed gear, a revoluble support for said planetary gears, said support being supported coaxially with said internally toothed gear, a main propeller, means for connecting said main propeller coaxially with said support to turn therewith, a frame revolubly supported by the crank pin of said crank shaft, and cranks for connecting said frame with said planetary gears to transmit rotary motion from said crank to said planetary gears, substantially as described.

5. In combination, a drive shaft, an eccentric mounted on said drive shaft, to turn therewith, a propeller mounted to said drive shaft to turn therewith, a gear rotatable about said drive shaft, a counter propeller, means for connecting said counter propeller coaxially with said gear to turn therewith, planetary gears meshing with said gear, a support for said planetary gears, said support being arranged to turn about the axis of said gear, a main propeller, means for connecting said support coaxially with said main propeller to turn therewith, a frame revolubly supported by said eccentric, and means for connecting said frame with said planetary gears to transmit rotary motion from said eccentric to said planetary gears, substantially as described.

6. In combination, a plurality of axially aligned propellers, a rotatable shaft and means for drivably connecting said shaft and propellers to rotate the latter at different speeds and in opposite directions said means including reduction gearing and eccentric means for positively rotating a portion of said reduction gearing about its axis in the same direction during operation.

7. In combination, a plurality of propellers, a rotatable shaft and means for drivably connecting said shaft and propellers to rotate the latter at different speeds and in opposite directions said means comprising speed reduction means and means eccentric with respect to said shaft and drivably connected therewith for positively rotating a portion of said speed reduction means about its axis in the same direction during rotation.

8. In combination, a plurality of propellers, means including speed reduction mechanism for rotating said propellers and means for arresting rotation of one of said propellers during operation.

9. The combination with a plurality of axially aligned propellers, of a driving shaft, speed reducing mechanism for drivably connecting said shaft and propellers and means for stopping the rotation of one of said propellers during operation.

10. In combination, a plurality of propellers, common means for rotating said propellers at different speeds and means for arresting the rotation of one of the propellers during operation.

WILLIAM STELZER.